July 14, 1959
S. STEIN
2,894,675
SELF-ATTACHING DISPOSABLE LITTER BAG
Filed July 5, 1957
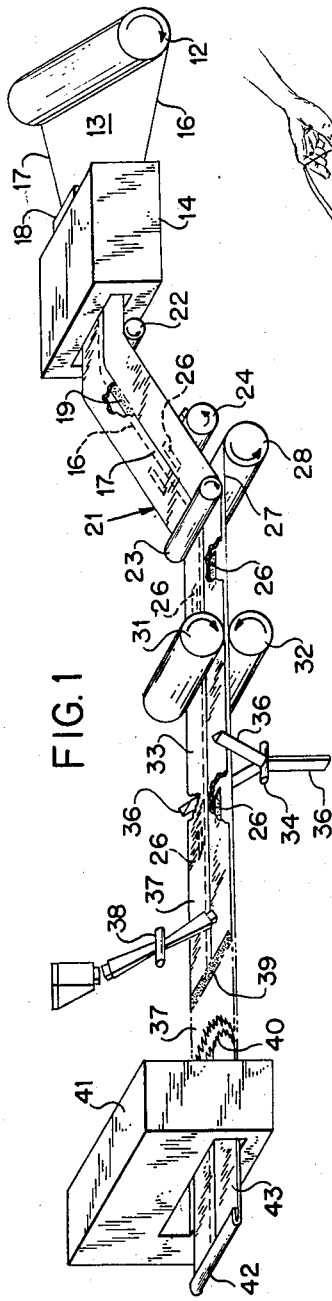
FIG. 1
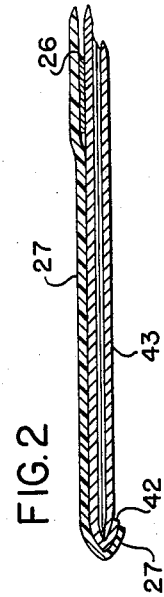
FIG. 2
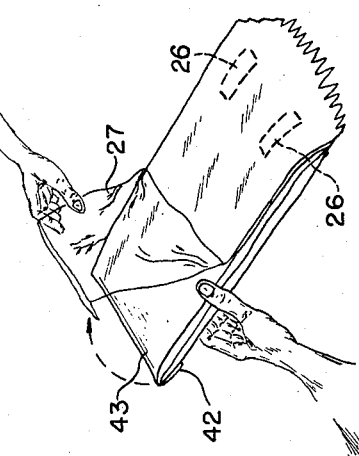
FIG. 3
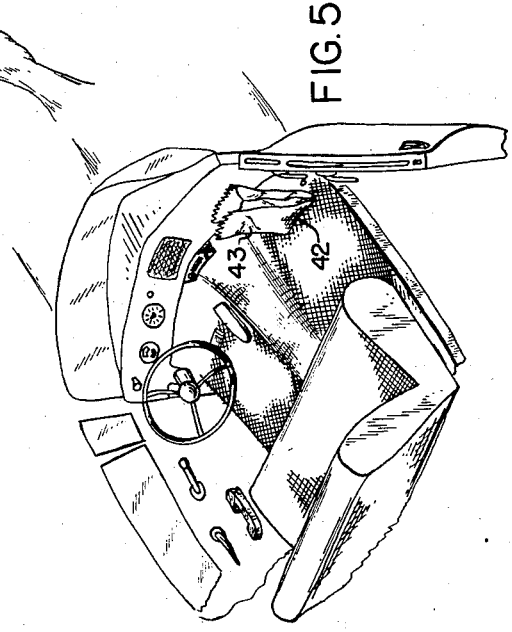
FIG. 5
FIG. 4
INVENTOR
SAM STEIN United States Patent Office 2,894,675
Patented July 14, 1959

2,894,675

SELF-ATTACHING DISPOSABLE LITTER BAG

Sam Stein, Hohokus, N.J.

Application July 5, 1957, Serial No. 670,134

1 Claim. (Cl. 229—53)

The present invention relates generally to receptacles, and it has particular relation to a litter bag for holding refuse, which has its own means for removable attachment to a side of a desk, bed, wall of a room, dashboard of an automobile and the like.

For sometime there has been an effort made to dispose of refuse in a simple and sanitary manner, and this has become more acute when traveling on modern highways, such as turnpikes, freeways and the like, which have substantial penalties and fines for dropping litter from an automobile traveling along them. Then, too, in hospitals where it can be attached to the beds and in doctors' offices where it can be attached to the sides of a desk, the old fashioned waste basket is on its way out because of the large amount of space it requires and its size permits too infrequent emptying, making it not only unsightly but also insanitary.

Several definite steps have been taken to provide improved means for disposing of refuse in a simple and highly sanitary manner. Paper bags have been provided with a dry adhesive end edge, which, when wetted, permits its opposite edge to be folded over and sealed after filling to close the same permanently.

Litter bags have also been provided for automobiles that consist of waxed paper bags having a plastic strip or stay mounted along its back edge adjacent its open end, which stay extends outwardly from opposite sides thereof. This bag is sold in small quantities and the purchaser is provided with a rectangular plastic strip, having a back coated with pressure-sensitive adhesive protected by a removable cover strip, and a pair of widely spaced holes along its lower bottom edge, which holes are adapted to receive the free ends of the stays built into each of the disposable litter bags. Such bags cannot be mounted without the proper type of mounting strip. The cost of providing a mounting strip and providing each bag with a mounting stay makes the purchase price prohibitive to the average every day shopper.

The present invention obviates the disadvantages inherent in the foregoing prior art bags, and provides a self-attaching, disposable, litter bag, sealable when filled, which can be made on a standard bag making machine without materially increasing the cost of said bag over the cost of an ordinary bag.

An object of the present invention is to provide a method of making self-attaching, readily removable, disposable liter bags on a standard bag machine without requiring a major modification of such machines whereby they cannot be used for making plain bags when desired without requiring remodification.

A further object of the invention is the provision of an efficient and economical method of making self-attaching, readily removable, disposable litter bags that can be sealed when filled, and which can be made to sell at reasonable prices within the reach of every purchaser.

Another object of the invention is to provide a litter bag that is removably attachable to a flat surface, sealable when filled, and that requires no special machinery to make or expensive adjustments to standard bag making machines.

A further object of the invention is the provision of a self-attaching, self-sealing litter bag that is economical to make, efficient and easy to use, and which requires no special attaching devices or wetting to use.

Another object of the invention is to provide a self-attaching, self-sealing litter bag that is provided with a removable protective sheet, which not only covers the surface area of the adhesive patch or patches but also covers one entire side of its bag and folds around its closed end, which fold assists in maintaining the position of the cover sheet during stacking and packaging.

A further object of the invention is the provision of a self-attaching, self-sealing, litter bag that is provided with a greatly enlarged adhesive protective sheet, which provides means for wrapping refuse, such as apple cores and the like, before they are deposited in said bag.

Another object of the invention is to provide an adhesive material that will not only provide means for attaching the litter bag to the sides of most any type of supporting surface, such as a desk, or dashboard of an automobile, but which may also be used eventually as a means for finally sealing the contents of the closed bag when the same is ready for final disposal.

Other and further objects and advantages of the invention reside in the detailed steps of the method and detailed construction of the bags, which result in simplicity, economy and efficiency, and which will be apparent from the following description, wherein several preferred embodiments of the invention are shown, reference being had to the accompanying drawings, forming a part hereof, wherein like numerals indicate like parts, in which:

Figure 1 is a diagrammatic view of a standard bag machine operation, showing the several steps used in the method of making a self-attaching, readily removable, disposable litter bag in accordance with this invention;

Figure 2 is an enlarged longitudinal sectional view of one form of gusseted bag made in accordance with the principles of the invention;

Figure 3 is a perspective view of the bag shown in Figure 2, illustrating the manner of removal of the protective sheet from the pressure-sensitive adhesive that secures it to one side of said bag;

Figure 4 is another perspective view of a bag showing a modified form in which the pressure-sensitive adhesive may be applied, with its protective covering removed therefrom;

Figure 5 is a perspective view on a smaller scale showing how the bags of Figures 3 and 4 may be conveniently and easily mounted on the dashboard of a conventional automobile for use in collecting refuse while driving along a highway.

Referring now to the drawings, there is shown in Figures 1 to 5, both inclusive, one method and form which the invention may assume. In this method and form, the pressure-sensitive adhesive is applied as a liquid to cover a small patch or area on the outer surface of a bag on its back or longer side and adjacent its open end, preferably about one short fold between said end and the beginning of said adhesive patch.

There is shown diagrammatically in Figure 1, one method of embodying the invention in a conventional bag during the process of forming said bag on a standard bag forming machine. This method requires but two slight and inexpensive additions to any standard bag machine, to-wit: (1) an additional adhesive applicator for applying pressure-sensitive adhesive and (2) a feed roll for holding a supply of treated paper. When these two additions have been made to an existing standard bag forming machine, and it is the desire to manufacture conventional bags thereon without incorporating the present invention into such bags, it is only necessary to ignore the additions, i.e., fail to fill the applicator with pressure-sensitive adhesive and fail to mount a roll of treated paper on the extra feed roller.

In the method illustrated diagrammatically in the drawings, a roll of paper bag material 12 is fed in a horizontal plane as a flat moving strip of paper 13 into a standard tube former 14. In passing through the tube former 14, the side edges 16 and 17 of the paper strip 13 are brought into a superimposed position substantially to form a tube. A glue applicator 18 applies a continuous strip of quick-drying liquid glue 19 along one side edge of the paper strip 13. The flat paper strip 13 entering the right side of the tube former 14 leaves its left side as a continuous tube 21.

The tube 21 passes over the guide roller 22 and before it passes under the next guide roller 23, a second applicator 24 applies to its underside at longitudinally spaced intervals one or more patches or areas of a pressure-sensitive adhesive 26 in any suitable manner.

As the tube 21 with its patches of pressure-sensitive adhesive 26 passes under the guide roller 23, a sheet of treated paper 27 is positioned underneath, which treated paper 27 comes from a supply roll 28. The treated paper 27 is of substantially the width of the tube 21, and completely covers the bottom side thereof. However, its width need be only the width of the pressure-sensitive adhesive patch, or, if there are more than one patch and they are spaced transversely of the tube, the transverse width of the spaced patches will be the minimum width of the treated paper, since it is used only to protect said patches. The treated paper 27 and the tube 21 become attached removably under the pressure of the drive rollers 31 and 32, which exert pressure on the pressure-sensitive adhesive patches 26 as they pass therebetween to form a laminated unit 33, which is subsequently cut into lengths and folded into bags.

The laminated unit 33 continues to move through the machine and passes through a cutter 34, which consists of a series of spaced revolving knife blades 36 that cuts the continuous laminated unit 33 into individual pieces or sections 37 of equal lengths, each section having the conventional serrated ends 40 of unequal length. Each individual piece 37 is passed under another quick-drying glue applicator 38, which applies a narrow transversely extending strip of quick-drying glue 39 adjacent the forward end thereof. The individual piece or section 37 is then carried into a bag folder 41, where the forward end of said piece 37 is folded backwardly upon itself and over said glue strip 39 to form the sealed bottom 42 of the finished bag 43.

It will be noted from the drawings that the length and width of the patch or the number patches may be varied, being dependent upon the size of the bag, the nature of the bag material, the quality of the adhesive, etc. It is impossible to give any exact data as to the size of the area or areas of said pressure-sensitive adhesive as compared to the size of each bag because of the large number of known variables involved. The main purpose of the adhesive patches is to support the bag when filled with refuse, and the area of adhesive for any given size of bag can be determined easily by a few simple experiments at the time of practicing the invention. The length of each patch should, however, be sufficient to take at least a double fold of the open end of the bag material at the time of closing in order to insure against said bag opening up after being filled and discarded.

It will be noted in Figure 2 of the drawings, which shows the bag made by the method illustrated in Figure 1, that the treated paper 27 covers not only the entire side of the finished bag but also folds around its closed end 42. This fold around the closed end 42 tends to keep the treated paper covering in juxtaposition against the side of the bag and facilitates handling and stacking. It also facilitates removal of the protective covering sheet 27 from the pressure-sensitive adhesive 26–a, as best shown in Figure 4, since it is loose and easy to grasp.

When it is desired to use the finished bags as a litter holder, it is only necessary to remove the treated paper 27 from the pressure-sensitive adhesive patches 26. This can be done by grasping the folded free end of the treated paper 27 at the bottom of the bag 43 and peeling the same back longitudinally of the bag with a firm but gentle pull. The sheet of treated paper 27, when it has been removed from the bag 43, has not destroyed any of the adhesive qualities of the pressure-sensitive adhesive patches. They will be found ready to stick to almost any surface under the application of pressure, such as the dashboard of an automobile as best shown in Figure 5. The treated paper 27 after its separation from the litter bag 43 can be used to wrap desirable refuse, such as the cores of fruit, etc.

The term "paper bag material" is used to denote any material suitable for making bags. The term "treated paper" is intended to include all papers or like liners having a characteristic of adhering to pressure-sensitive adhesives and being removable therefrom without affecting the adhesive qualities thereof. Wax paper has been found entirely suitable for the purpose and is quite inexpensive as compared to cellophane, polyester treated papers and other plastic treated materials, which I have also found suitable but too expensive. The term "pressure-sensitive adhesive" is intended to include any adhesive that does not require wetting but merely pressure to bring out its adhesive qualities. The term "glue" is used to denote an inexpensive adhesive that is commonly used in sealing seams of conventional bags, and requires wetting to bring out its adhesive qualities or must be applied in a liquid state.

Although I have only shown two embodiments which the invention may assume, it will be readily apparent to those skilled in the art that various other modifications may be made therein without departing from the spirit thereof or from the scope of the appended claim.

What I claim is:

An open top self-attaching disposable flat paper bag having a closed bottom formed with a single transverse fold with the folded portion being adhesively secured to one side of said bag, at least one patch of pressure-sensitive adhesive on the opposite side of said bag from said folded bottom, a removable sheet of treated paper covering the adhesive side of said bag and having its lower end folded around the bottom of said bag and terminating substantially along the edge of said folded bottom, said sheet being secured to said bag only by said pressure-sensitive adhesive.

References Cited in the file of this patent

UNITED STATES PATENTS

| | | |
|---|---|---|
| 1,782,884 | Royal | Nov. 25, 1930 |
| 2,116,571 | Gurwick | May 10, 1938 |
| 2,774,531 | Rosenthal | Dec. 18, 1956 |
| 2,778,365 | Silverman et al. | Jan. 22, 1957 |
| 2,790,591 | Rosen | Apr. 30, 1957 |

FOREIGN PATENTS

| | | |
|---|---|---|
| 60,617 | Netherlands | Jan. 16, 1948 |